(12) United States Patent
Wei et al.

(10) Patent No.: US 11,513,431 B2
(45) Date of Patent: Nov. 29, 2022

(54) SYSTEMS AND METHODS FOR LIGHT PROJECTION

(71) Applicant: Cepton Technologies, Inc., San Jose, CA (US)

(72) Inventors: Wei Wei, Sunnyvale, CA (US); Dongyi Liao, Mountain View, CA (US); Mark A. McCord, Los Gatos, CA (US)

(73) Assignee: Cepton Technologies, Inc., San Jose, CA (US)

( * ) Notice: Subject to any disclaimer, the term of this patent is extended or adjusted under 35 U.S.C. 154(b) by 63 days.

(21) Appl. No.: 16/752,529

(22) Filed: Jan. 24, 2020

(65) Prior Publication Data

US 2020/0241399 A1    Jul. 30, 2020

Related U.S. Application Data

(60) Provisional application No. 62/797,113, filed on Jan. 25, 2019.

(51) Int. Cl.
| | | |
|---|---|---|
| *G03B 21/14* | (2006.01) | |
| *G03B 21/20* | (2006.01) | |
| *G02B 26/10* | (2006.01) | |
| *H04N 9/31* | (2006.01) | |

(52) U.S. Cl.
CPC ....... *G03B 21/142* (2013.01); *G03B 21/2033* (2013.01); *G02B 26/10* (2013.01); *H04N 9/312* (2013.01)

(58) Field of Classification Search
CPC ...... G03B 21/00–64; H04N 9/31–3197; B60Q 2400/00–50; B60Q 1/00–56; B60Q 2300/00–47
See application file for complete search history.

(56) References Cited

U.S. PATENT DOCUMENTS

| | | | | |
|---|---|---|---|---|
| 2009/0046474 A1* | 2/2009 | Sato | ...................... | F21S 41/176 362/466 |
| 2010/0053565 A1* | 3/2010 | Mizushima | ........ | G03B 21/2033 353/38 |
| 2013/0258689 A1* | 10/2013 | Takahira | ............... | F21S 41/176 362/465 |
| 2014/0092618 A1* | 4/2014 | Yagi | ...................... | F21S 41/143 362/512 |
| 2016/0069527 A1* | 3/2016 | Komatsu | ............... | F21S 41/255 362/512 |
| 2018/0119914 A1* | 5/2018 | Mayer | .................. | F21S 41/635 |

* cited by examiner

*Primary Examiner* — Christopher A Lamb, II
(74) *Attorney, Agent, or Firm* — Kilpatrick Townsend & Stockton LLP (57) ABSTRACT

A light projection system includes a base, a lens, and a set of flexures flexibly attaching the lens to the base. The light projection system further includes a board fixedly attached to the base, and a light source mounted on the board and spaced apart from the lens along an optical axis of the lens. The light source is configured to emit a light beam to be projected by the lens toward a scene. The light projection system further includes a driving mechanism configured to scan the lens via the set of flexures in a plane substantially perpendicular to the optical axis of the lens, thereby scanning the light beam emitted by the light source over the scene.

27 Claims, 7 Drawing Sheets

SYSTEMS AND METHODS FOR LIGHT PROJECTION

CROSS-REFERENCES TO RELATED APPLICATIONS

This application claims the benefit and priority to U.S. Provisional Application No. 62/797,113, filed Jan. 25, 2019, entitled "SYSTEMS AND METHODS FOR IMAGE PROJECTION," the entire content of which is incorporated herein by reference for all purposes.

BACKGROUND OF THE INVENTION

Various image display technologies have been developed. However, there is a need for high-brightness and high-efficiency image projection systems. There is also a need for adaptive illumination systems.

SUMMARY OF THE INVENTION

According to some embodiments, a light projection system includes a base, a lens, and a set of flexures flexibly attaching the lens to the base. The light projection system further includes a board fixedly attached to the base, and a light source mounted on the board and spaced apart from the lens along an optical axis of the lens. The light source is configured to emit a light beam to be projected by the lens toward a scene. The light projection system further includes a driving mechanism configured to scan the lens via the set of flexures in a plane substantially perpendicular to the optical axis of the lens, thereby scanning the light beam emitted by the light source over the scene.

According to some other embodiments, a light projection system includes a base, a lens attached to the base, a board, and a first set of flexures flexibly attaching the board to the base. The light projection system further includes one or more light sources mounted on the board and spaced apart from the lens along an optical axis of the lens. Each light source is configured to emit a respective light beam to be projected by the lens toward a scene. The light projection system further includes a driving mechanism configured to scan the board via the first set of flexures in a first plane substantially perpendicular to the optical axis of the lens, thereby scanning the respective light beam emitted by each light source over the scene.

According to some further embodiments, a method of projecting an image onto a scene is provided. The method includes emitting, using a light source, a light beam, and scanning a lens relative to the light source in a plane substantially perpendicular to an optical axis of the lens. The light source is positioned substantially at a focal plane of the lens. The lens is configured to project the light beam toward the scene so that the light beam illuminates a plurality of pixels sequentially as the lens is scanned. Each pixel corresponds to a respective position of the lens. The method further includes modulating the light beam synchronously with the scanning of the lens such that each pixel of the plurality of pixels is illuminated according to a content of an image, thereby forming the image on the scene.

DETAILED DESCRIPTION OF THE SPECIFIC EMBODIMENTS

Embodiments of the present invention provide systems and methods for projecting a two-dimensional image by rapidly scanning light source(s) relative to a projection lens. The scanning may be performed via mechanical motions of the light source(s), or the mechanical motions of the projection lens, or mechanical motions of both the light source(s) and the projection lens. The scanning may be achieved by using flexures. The flexures can be resonant flexures or non-resonant flexures, or a combination of resonant flexures and non-resonant flexures. The mechanical motions can be one-dimensional or two-dimensional. In some embodiments, for a two-dimensional scanning, the scan may be of a Lissajous type of patterns.

Applications may include imaging devices, such as miniature projection devices and high-power projection devices, lighting controls such as adaptive automotive headlamp controls, and the like. The systems and methods according to embodiments of the present invention may have several advantages. For example, they may afford the ability to project an image in which each pixel is illuminated by a laser or a light-emitting diode (LED), but the number of light sources may be fewer than the number of pixels in the image.

Figure 1:
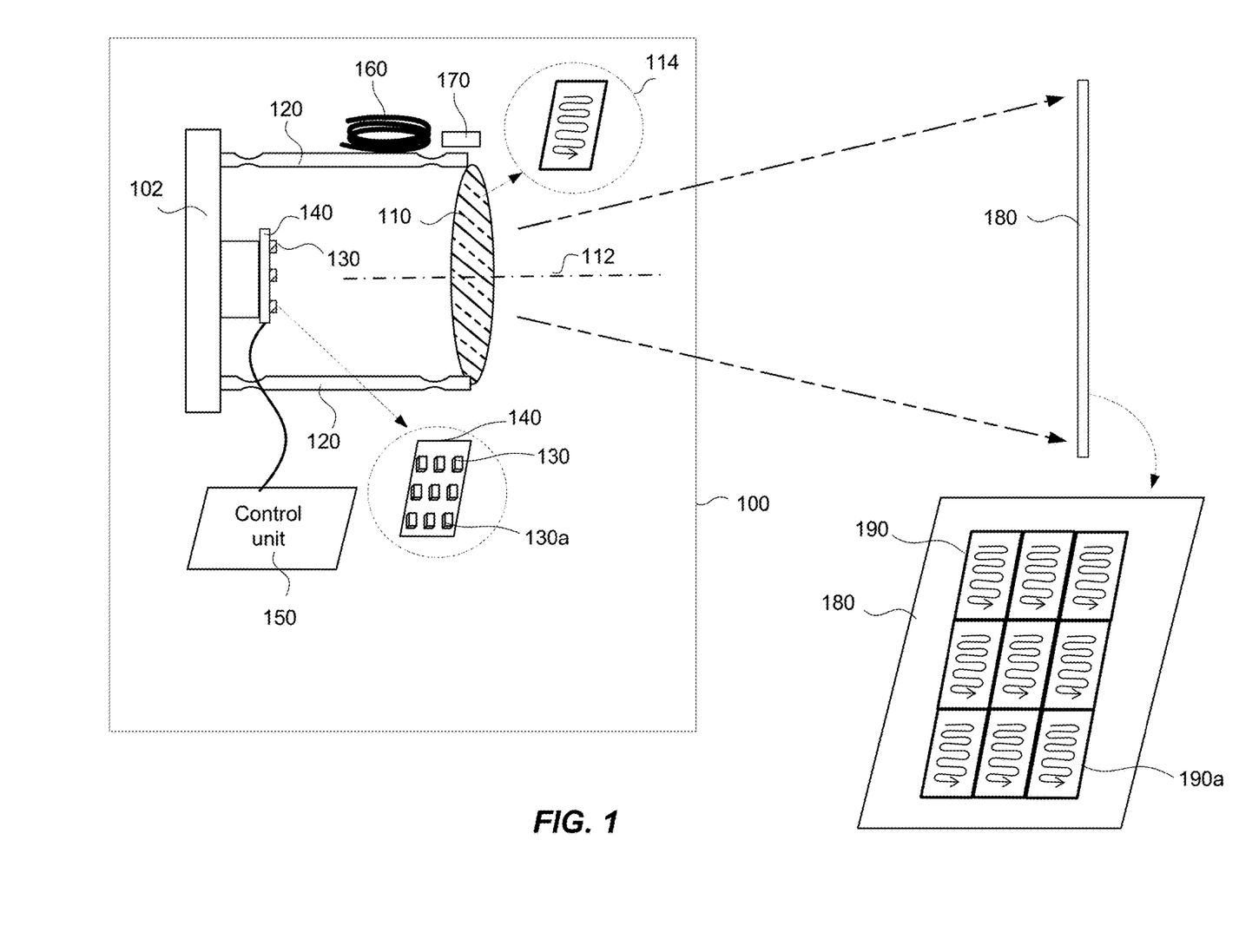
FIG. 1 shows a schematic diagram illustrating an exemplary projection system according to some embodiments.

FIG. 1 shows a schematic diagram illustrating an exemplary projection system 100 according to some embodiments. The projection system 100 includes a lens 110, and one or more light sources 130 mounted on a board 140. The lens 110 may be referred herein as a projection lens. The board 140 may be referred herein as an optoelectronic board. The light sources 130 are spaced apart from the lens 110 along the optical axis 112 of the lens 110, so that light beams emitted by the light sources 130 may be projected by the lens 110 toward a screen 180 or a scene at certain distance in front of the lens 110. For example, the light sources 130 may be positioned on a focal plane of the lens 110 so that light beams emitted by the light sources 130 may be substantially collimated by the lens 110.

According to some embodiments, the board 140 is fixedly attached to a base 102, and the lens 110 is flexibly attached to the base 102 via a set of flexures 120, as illustrated in FIG. 1. The set of flexures 120 may comprise a set of flexible beams that can be bent in one dimension or two dimensions. A driving mechanism 160 may cause the set of flexures 120 to bend in an oscillatory motion, so as to scan the lens 110 in a plane perpendicular to the optical axis 112 of the lens 110. The lens 110 may be scanned in one dimension or two dimensions in the plane according to various embodiments.

The driving mechanism 160 may include, for example, one or more voice coils, or one or more piezoelectric transducers, or one or more linear motors. In some embodiments, the projection system 100 may include a position sensing encoder 170 configured to determine the position of the lens 110 as the lens 110 is being scanned. To achieve a relatively large scanning motion with minimal power, the driving mechanism 160 may be operated at or nearly at a resonance frequency of the flexures 120. In the case of two-dimensional scanning, the driving mechanism 160 may be operated at a resonance frequency of the flexures 120 in one dimension and at a non-resonance frequency in the other dimension (e.g., for a raster scan pattern), or nearly at the resonance frequency in both dimensions (e.g., for a Lissajous scan pattern).

As an example, the inset 114 in FIG. 1 illustrates a raster scan pattern of the lens 110. The scanning motion of the lens 110 relative to the light sources 130 may cause the projected image 190 of the light beam emitted by each light source 130 to be scanned in a similar pattern on the screen 180, as illustrated in FIG. 1. If the lens 110 is scanned sufficiently rapidly (e.g., at a frame rate ranging from about 10 Hz to about 60 Hz), the projected image 190 of a single light source 130 may appear as though the pixels are illuminated by many individual light sources simultaneously due to the finite response time of human vision. Thus, the projection system 100 may be used to project an image in which each individual pixel is actively illuminated, yet the number of light sources are less than the number of pixels.

A raster scan pattern may be achieved by scanning the lens 110 in a first dimension (e.g., in the horizontal direction) relatively quickly, and in a second dimension orthogonal to the first dimension (e.g., in the vertical direction) relatively slowly. For example, the lens 110 may be placed on a first scanning stage that is scanned relatively rapidly in one dimension using a resonant flexure. The first scanning stage may be placed on a second scanning stage that is scanned relatively slowly in the orthogonal dimension, such that the combined motion executes a raster scan. The slower stage may or may not be resonant.

Although a raster scan pattern is illustrated in FIG. 1 as an example, other scan patterns are also possible, including but not limited to one dimensional scan patterns (e.g., either in the vertical direction or in the horizontal direction), two-dimensional Lissajous scan patterns, and the like. A two-dimensional Lissajous scan pattern may be achieved by scanning the lens 110 in two orthogonal dimensions at close but slightly different frequencies using two-dimensional flexures. For two-dimensional scanning, a set of rod springs (e.g., four rod springs) may be used as flexures. The rod springs may be made to have slightly different resonance frequencies in the horizontal direction and the vertical direction. In some embodiments, the scanning frequencies in the horizontal direction and the vertical direction may be advantageously chosen to correspond to the resonance frequencies of the rod springs in the horizontal direction and the vertical direction, respectively.

Figure 2A:
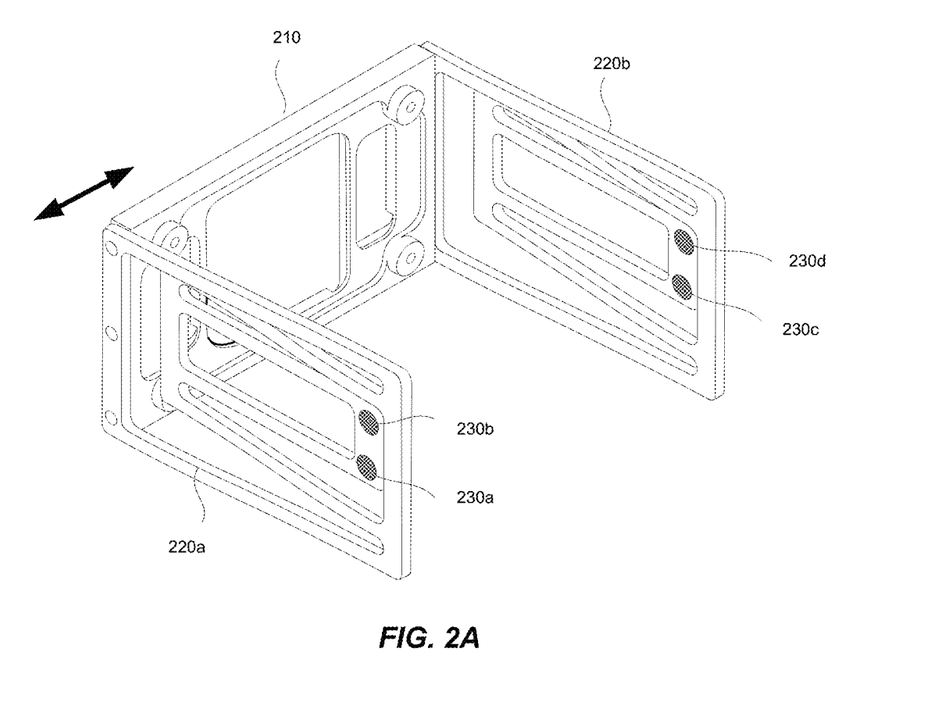
FIGS. 2A and 2B illustrate schematically a flexure mechanism for two-dimensional scanning according to some embodiments.
Figure 2B:
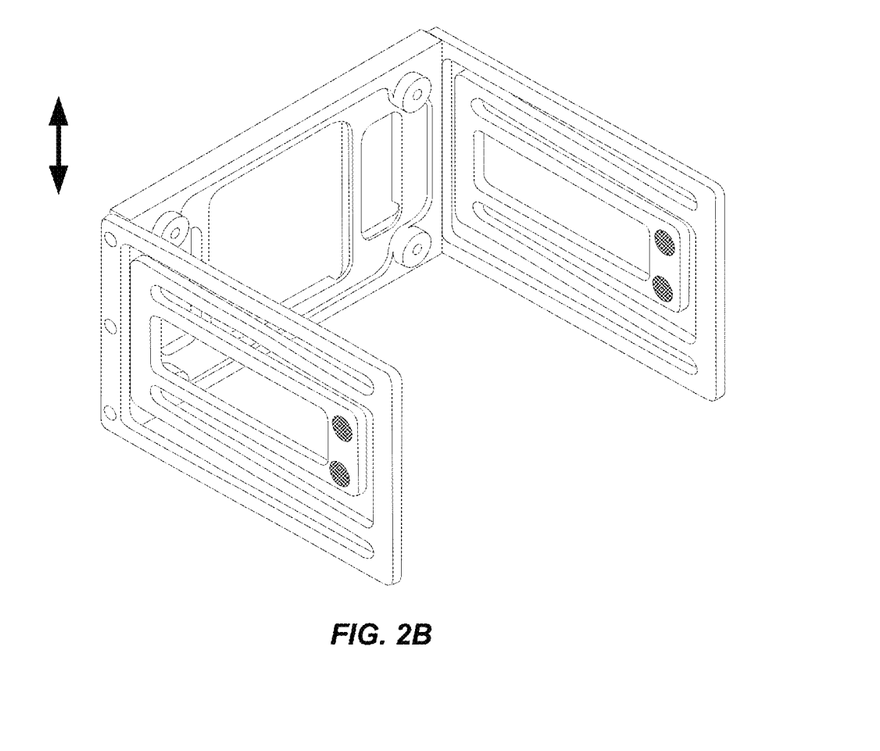

Other types of two-dimensional flexures different from the rod springs may also be used. FIGS. 2A and 2B illustrate schematically a flexure mechanism for two-dimensional scanning according to some embodiments. A frame 210 may be attached to a pair of flexures 220a and 220b on either side thereof. The frame 210 may carry a lens, such as the lens 110 in the projection system 100 illustrated in FIG. 1. Each of the pair of flexures 220a and 220b may be fabricated by cutting a plate of spring material. A convolution configuration, as illustrated in FIGS. 2A and 2B, may be used to increase the effective length of the spring member. One end of each of the pair of flexures 220a and 220b may be attached to fixed mounting points 230a-230d. The pair of flexures 220a and 220b may be flexed in both the horizontal direction and the vertical direction, so as to move the frame 210 horizontally and vertically, as indicated by the double-sided arrows in FIGS. 2A and 2B, respectively. To scan the lens 110 of a projection system 100 horizontally and vertically, the frame 210 may be vibrated at or near its resonance frequencies in both horizontal and vertical directions.

In the example illustrated in FIG. 1, nine light sources 130 are arranged as a 3×3 array. The light beam emitted by each light source 130 forms a corresponding scanning image 190 on the screen 180. For example, the light beam emitted by the light source 130a on the lower right forms a scanning image 190a on the lower right of the screen 180. The scan range of the lens 110 may be advantageously chosen so that the scanning images 190 of the light beams emitted by the individual light sources 130 are tiled with respect to each other to form a larger image. In other words, the individual image 190 of each light beam emitted by each light source 130 covers a subfield of a larger field of view. Therefore, relatively few light sources 130 may cover a relatively large image area, and yet the pixel resolution of the image may be much higher than the pixel resolution if the lens 110 is fixed. In some embodiments, the subfields of adjacent light sources may overlap slightly.

According to various embodiments, each light source 130 may include a laser or a light-emitting diode (LED). Each light source 130 may be a fixed emitter, such as an LED chip-on-board (COB). In some embodiments, the light sources 130 may be a computer controlled array of colored LEDs or laser sources, or white LEDs, depending on the applications of the projection system 100. Some exemplary applications are discussed below.

Projecting Black-and-White Images or Color Images

In some embodiments, the projection system 100 illustrated in FIG. 1 may be used as a miniature projection device or high-power projection device for projecting black-and-white or color images. Such a projection system may be referred herein as a micro-motion projection system. The projection system 100 may include a control unit 150 configured to modulate the light beam emitted by each light source 130 synchronously with the scanning of the lens 110, such that each pixel on the screen 180 is illuminated according to a content of an image, thereby forming the image on the screen 180. Position sensing encoders 170 may be used to obtain accurate positions of the lens 110 for more precise synchronization.

To project color images, each light source 130 may include three light-emitting elements configured to emit red light, green light, and blue light, respectively. The control unit 150 may modulate the intensities of the red light, the green light, and the blue light, to project a color image on the screen 180. Other primary colors, such as magenta, yellow, and cyan, can also be used to produce a gamut of colors. Because most of the photons emitted by each light source 130 may reach the screen 180, the projection system 100 may afford very high efficiencies. This may allow very high brightness images to be projected with a relatively compact and low power projection unit.

Adaptive Vehicle Headlamps

The projection system 100 illustrated in FIG. 1 may also be used as an adaptive headlamp on vehicles. For example, the scanning range (in the vertical direction or the horizontal direction, or in both the vertical direction and the horizontal direction) may be adaptively adjusted based on the traveling speed of the vehicle and the presence of any on-coming traffic. According to some embodiments, the projection system 100 used as a vehicle headlamp may include a single horizontal row of LEDs or laser sources 130. The lens 110 may be scanned up and down vertically. By varying the range of the vertical scan, the height of the projected light beam may be adaptively adjusted so as to change from high beam to low beam, or vice versa, according to the presence or absence of any on-coming traffic. In some embodiments, as the scan range is reduced (e.g., for a low-beam state), the power of the LEDs or lasers may be correspondingly reduced to keep the overall brightness of the projected light beam in a desired range.

Figure 3:
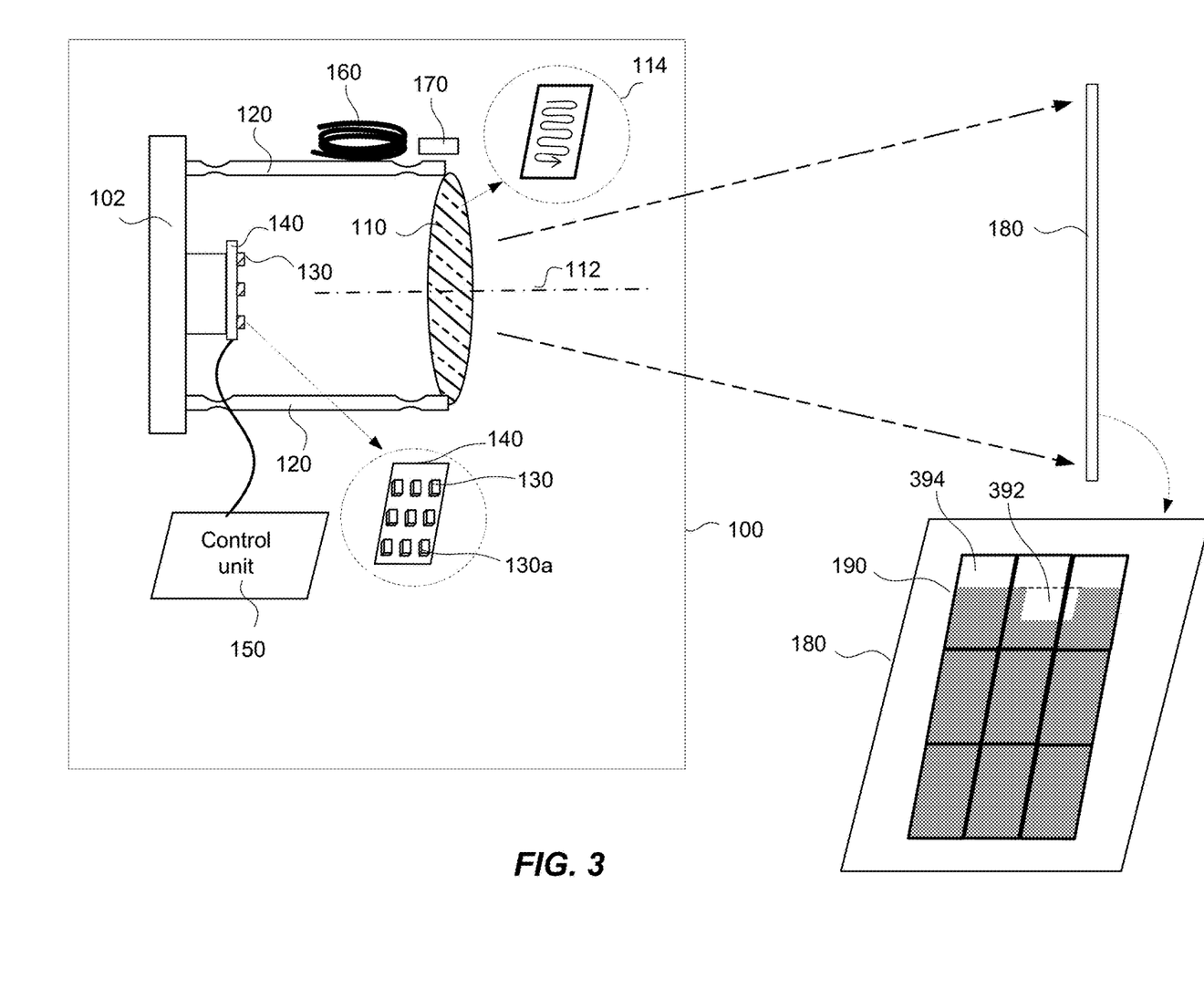
FIG. 3 illustrates an application of the projection system shown in FIG. 1 as an adaptive vehicle headlamp according to some embodiments.

FIG. 3 illustrates an application of the projection system 100 as an adaptive vehicle headlamp according to some embodiments. The projection system 100 may include a two dimensional array of light sources 130 (e.g., a 3×3 array in the example illustrated in FIG. 3). The repeated scanning of the lens 110 may form sequential image frames on the screen 180 (or a scene), each image frame corresponding to one repetition of the scanning. The control unit 150 may dynamically modulate the intensity of the light beam emitted by each light source 130 as the lens is scanned from frame to frame, so that the projected image 190 may selectively exclude certain regions from illumination depending on the driving conditions. For example, the region 392 may be excluded from illumination for a while due to the presence of an on-coming car in its vicinity. When the on-coming car has passed, the region 392 may be illuminated in subsequent frames.

According to some embodiments, the control unit 150 may also dim or turn off a row of light sources 130 (e.g., the top row) for a portion of the image 190 (e.g., the top portion 394), so as to lower the height of the overall projected light beam. Additionally or alternatively, the scan range of the lens may be dynamically changed from frame to frame, so that the image 190 covers different areas of the screen 180 for different frames.

Figure 4:
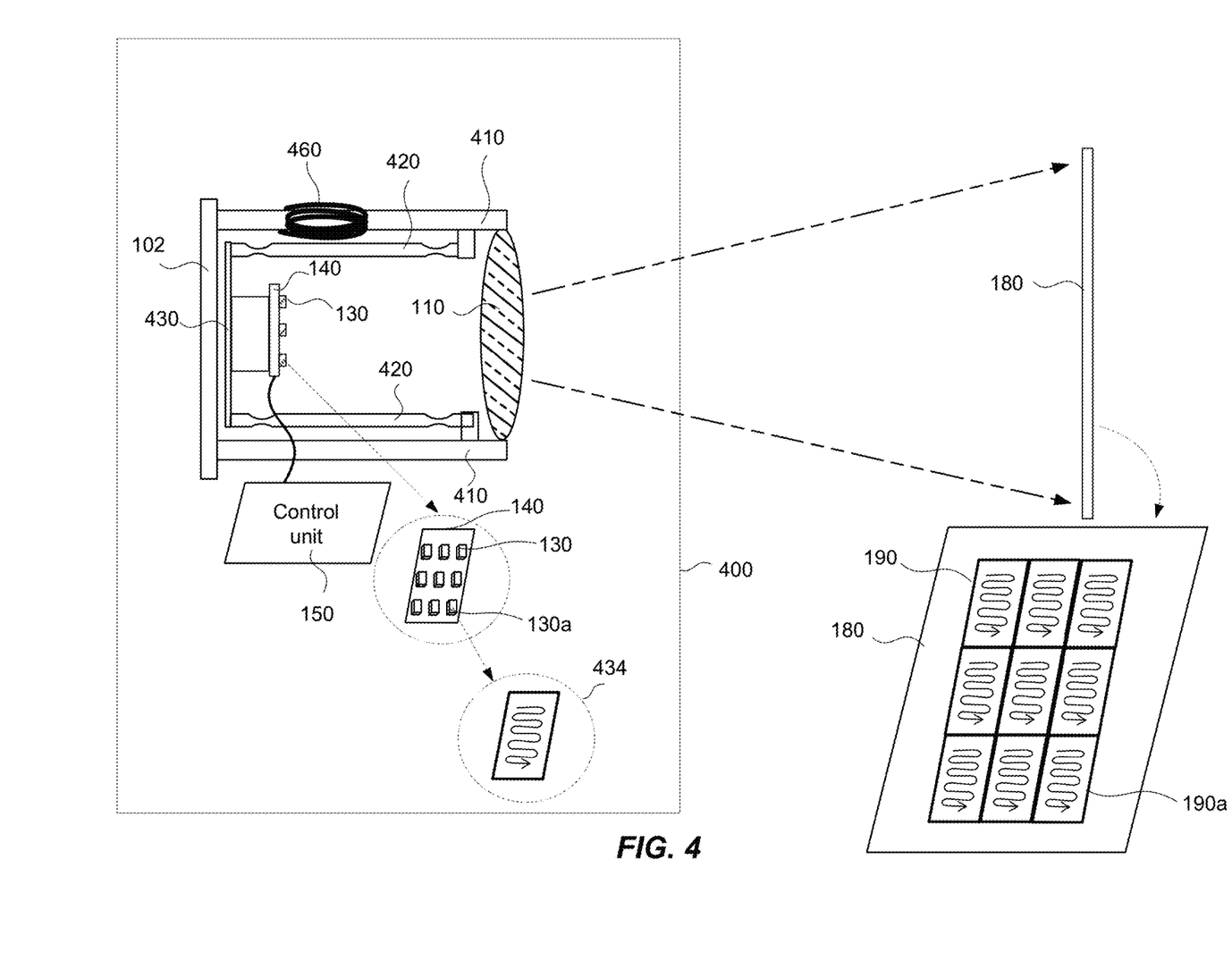
FIG. 4 illustrates a projection system according to some other embodiments.

According to some embodiments, a projection system may have the lens 110 fixed while scanning the light sources 130 relative to the lens 110. FIG. 4 illustrates a projection system 400 in which the lens 110 is fixed according to some embodiments. Here, the lens 110 is fixedly attached to the base 102 via a set of rigid supporting beams 410. The board 140 on which the light sources 130 are mounted may be attached to a platform 430. The platform 430 is flexibly attached to the rigid supporting beams 410 via a set of flexures 420. A driving mechanism 460 may cause the set of flexures 420 to bend in an oscillatory motion, so as to scan the light sources 130 in a plane perpendicular to the optical axis 112 of the lens 110. As an example, the inset 434 in FIG. 4 illustrates a raster scan pattern of a single light source 130. Similar to the case illustrated in FIG. 1, the relative motion between the light sources 130 and the lens 110 may cause the projected image 190 of the light beam emitted by each light source 130 to be scanned in a similar pattern on the screen 180, as illustrated in FIG. 4.

Figure 5:
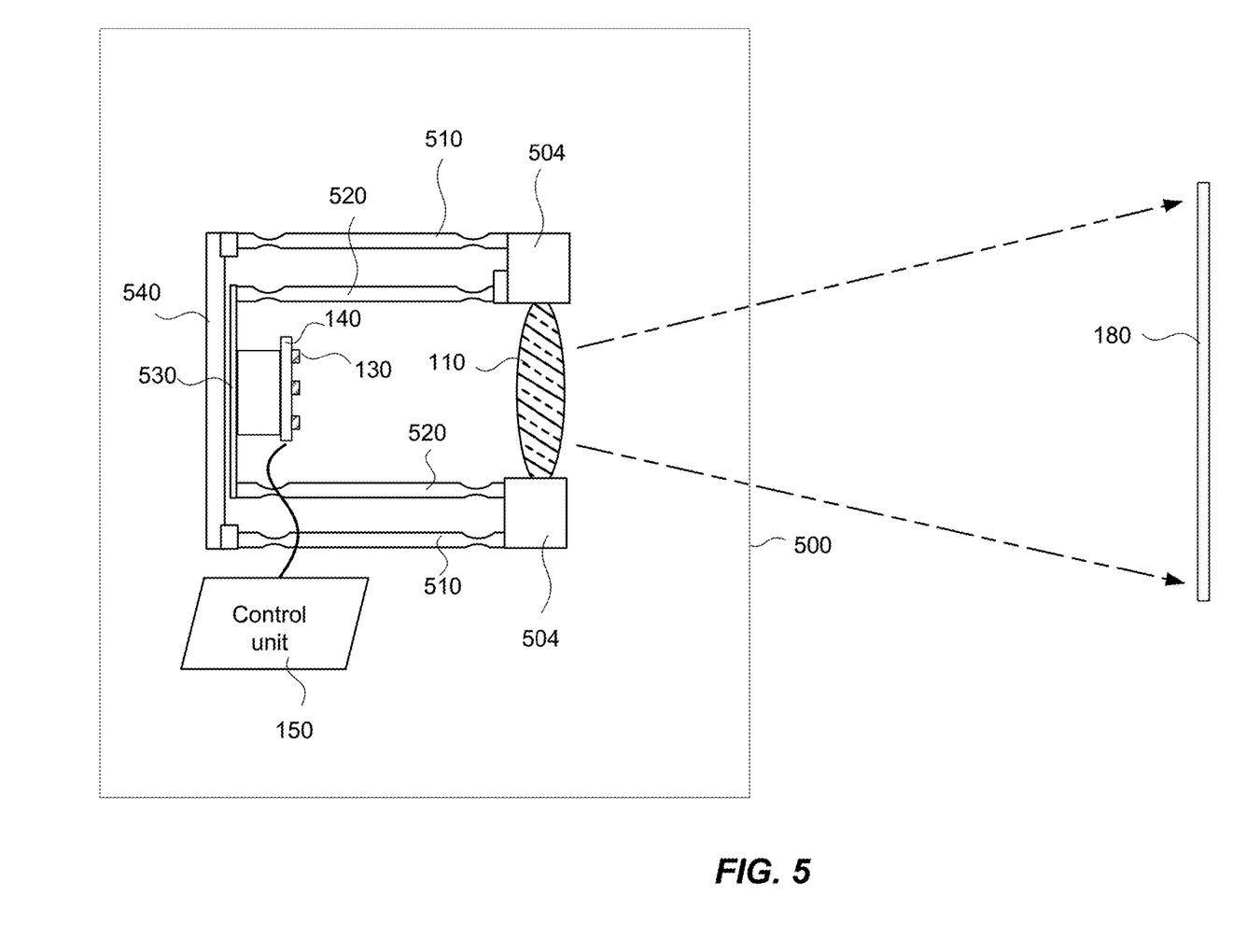
FIG. 5 illustrates a projection system according to some further embodiments.

FIG. 5 illustrates a projection system 500 according to some other embodiments. Here, the lens 110 is attached to a fixed lens mount 504. The lens mount 504 may be fixedly attached to a base (not shown). Similar to the projection system 300 illustrated in FIG. 3, the board 140 on which the light sources 130 are mounted is attached to a platform 530, which is in turn flexibly attached to the fixed lens mount 504 via a first set of flexures 520. The projection system 500 also includes a counterbalance structure 540, which is flexibly attached to the fixed lens mount 504 via a second set of flexures 510. A driving mechanism (not shown) may cause the platform 530 and the counterbalance structure 540 to be scanned in opposite directions at any instant, so that vibration of the projection system 500 may be mitigated or minimized.

Figure 6:
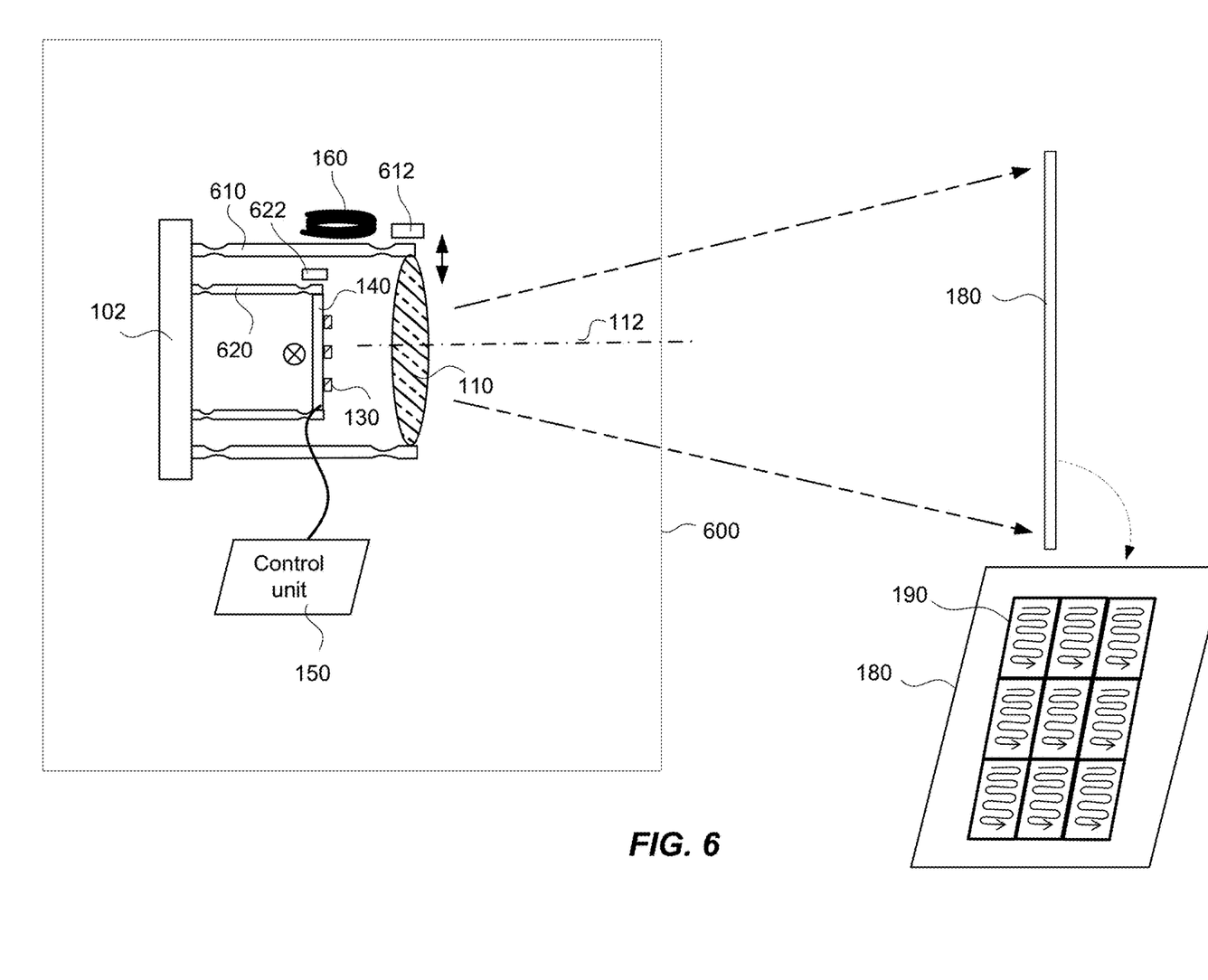
FIG. 6 illustrates a projection system according to some embodiments.

FIG. 6 illustrates a projection system 600, in which both the lens 110 and the light sources 130 are scanned, according to some embodiments. Here, the lens 110 is flexibly attached to the base 102 via a first set of flexures 610. The optoelectronic board 140 carrying the light sources 130 is flexibly attached to the base 102 via a second set of flexures 620. The optoelectronic board 140 is spaced apart from the lens 110 along the optical axis 112 of the lens 110 so that the light sources 130 are positioned substantially at the focal plane of the lens 110. A driving mechanism 160 may cause the first set of flexures 610 to bend in an oscillatory motion, thereby scanning the lens 110 in a first plane substantially perpendicular to the optical axis 112 of the lens 110. The driving mechanism 160 may also cause the second set of flexures 620 to bend in an oscillatory motion, thereby scanning the light sources 130 in a second plane substantially perpendicular to the optical axis 112 of the lens 110.

According to some embodiments, the lens 110 may be scanned in first dimension (e.g., in the vertical direction as indicated by the double arrow), and the light sources 130 may be scanned in a second dimension orthogonal to the first dimension (e.g., in the horizontal direction as indicated by the cross), so that the image is effectively scanned in two dimensions. In some embodiments, to achieve a raster scan pattern, the lens 110 may be scanned rapidly in one dimension, while the light sources 130 are scanned slowly in the orthogonal dimension; or the light sources 130 may be scanned rapidly in one dimension, while the lens 110 is scanned slowly in the orthogonal dimension.

According to some embodiments, both the lens 110 and the light sources 130 may be scanned in two dimensions. For example, the lens 110 and the light sources 130 may be scanned synchronously so that the lens 110 and the light sources 130 move in opposite directions at any instant. This may allow a relatively large effective scan range for the image 190 with a relatively small mechanical motion of the lens 110 and the light sources 130. Also, the vibration that may be caused by the motion of the lens 110 may be substantially canceled by the vibration that may be caused by the motion of the light sources 130.

Figure 7:
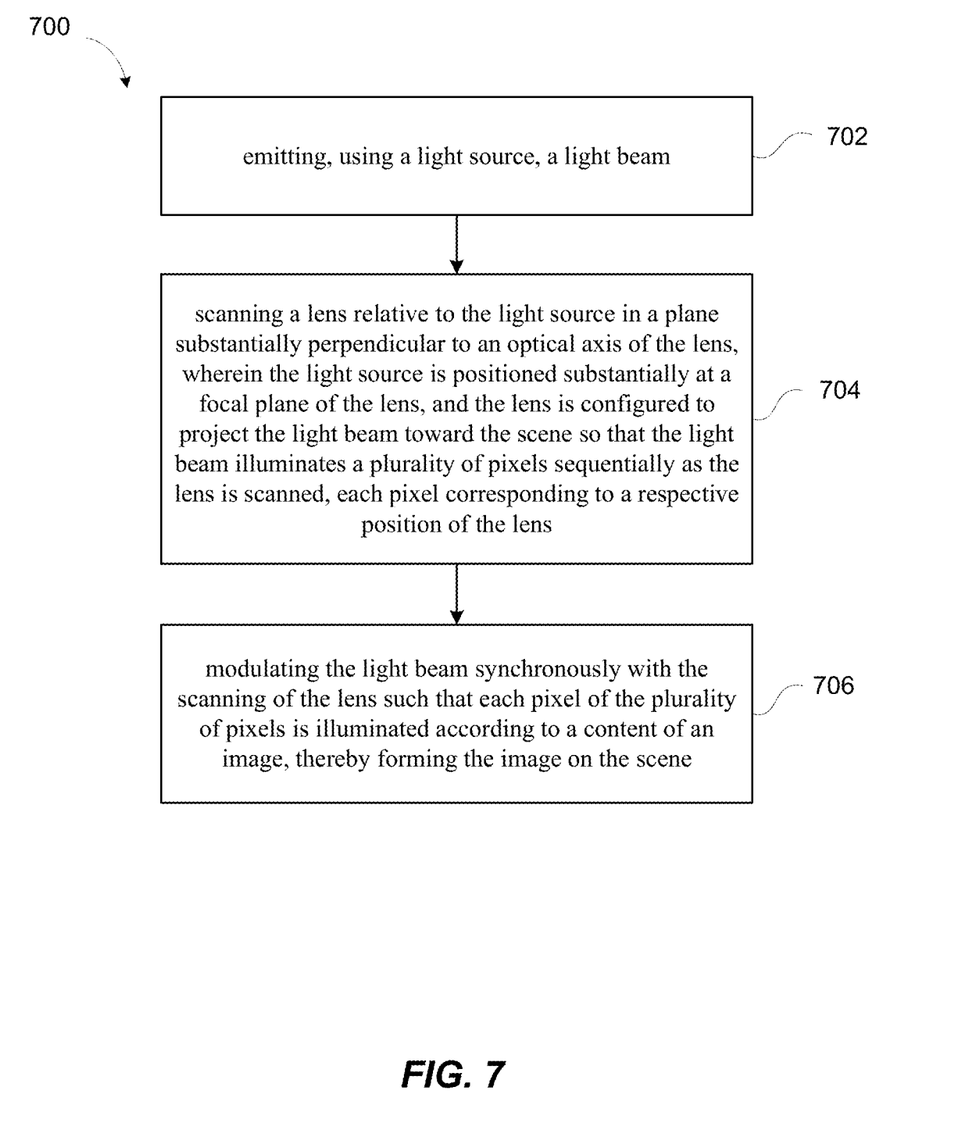
FIG. 7 shows a simplified flowchart illustrating a method of projecting an image on a screen according to some embodiments.

FIG. 7 shows a simplified flowchart illustrating a method 700 of projecting an image on a screen according to some embodiments. The method 700 includes, at 702, emitting, using a light source, a light beam; and at 704, scanning a lens relative to the light source in a plane substantially perpendicular to an optical axis of the lens. The light source is positioned substantially at a focal plane of the lens. The lens is configured to project the light beam toward the scene so that the light beam illuminates a plurality of pixels sequentially as the lens is scanned. Each pixel corresponds to a respective position of the lens. In some embodiments, the lens is scanned while the light source is fixed. In alternative embodiments, the lens may be fixed while the light source is scanned, or both the lens and the light source are scanned simultaneously.

The method 700 further includes, at 706, modulating the light beam synchronously with the scanning of the lens such that each pixel of the plurality of pixels is illuminated according to a content of an image, thereby forming the image on the scene. In some embodiments, modulating the light beam includes modulating an intensity of the light beam. In some embodiments, the image is a color image.

The light source may include three light-emitting elements configured to emit red light, green light, and blue light, respectively. Modulating the light beam may include modulating intensities of the red light, the green light, and the blue light. In some embodiments, the lens is scanned at a frame rate that ranges from about 10 Hz to about 60 Hz.

It should be appreciated that the specific steps illustrated in FIG. 7 provide a particular method of projecting an image according to some embodiments of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to explain the principles of the invention and its practical applications to thereby enable others skilled in the art to utilize the invention in various embodiments and with various modifications as are suited to the particular use contemplated.

A recitation of "a", "an" or "the" is intended to mean "one or more" unless specifically indicated to the contrary.

Ranges may be expressed herein as from "about" one specified value, and/or to "about" another specified value. The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. When such a range is expressed, another embodiment includes from the one specific value and/or to the other specified value. Similarly, when values are expressed as approximations, by use of the antecedent "about," it will be understood that the specified value forms another embodiment. It will be further understood that the endpoints of each of the ranges are included with the range.

What is claimed is:

1. A light projection system comprising:
   a base;
   a lens;
   a set of flexures flexibly attaching the lens to the base;
   a board fixedly attached to the base;
   a light source mounted on the board and spaced apart from the lens along an optical axis of the lens, the light source configured to emit a light beam to be projected by the lens toward a scene; and
   a driving mechanism configured to translate the lens relative to the light source via the set of flexures in a plane substantially perpendicular to the optical axis of the lens, thereby scanning the light beam emitted by the light source over the scene.

2. The light projection system of claim 1 wherein the scene comprises a screen, the light projection system further comprising:
   a controller configured to modulate the light beam emitted by the light source synchronously with the translation of the lens such that an image is formed on the screen, wherein each pixel of the image corresponds to a respective position of the lens.

3. The light projection system of claim 2 wherein modulating the light beam comprises modulating an intensity of the light beam.

4. The light projection system of claim 2 wherein the light source comprises three light-emitting elements configured to emit red light, green light, and blue light, respectively, and modulating the light beam comprises modulating intensities of the red light, the green light, and the blue light so that the image is a color image.

5. The light projection system of claim 1 wherein the driving mechanism is configured to translate the lens in two dimensions.

6. The light projection system of claim 1 wherein the set of flexures comprises a plurality of bendable beams.

7. The light projection system of claim 1 wherein the driving mechanism comprises a voice coil, a piezoelectric transducer, or a linear motor.

8. The light projection system of claim 1 is part of an automobile headlamp, the light projection system further comprising:
   a controller configured to dynamically change a range of translation of the lens so as to change the automobile headlamp from a high-beam state to a low-beam state, or vice versa.

9. The light projection system of claim 1 wherein the scanning of the light beam emitted by the light source forms one or more sequential image frames over the scene, and the light projection system further comprising:
   a controller configured to dynamically modulate the light beam emitted by the light source synchronously with the scanning of the light beam, so that the light beam illuminates different portions of the scene at two different image frames of the one or more sequential image frames.

10. A light projection system comprising:
    a base;
    a lens attached to the base;
    a board;
    a first set of flexures flexibly attaching the board to the base;
    one or more light sources mounted on the board and spaced apart from the lens along an optical axis of the lens, each light source configured to emit a respective light beam to be projected by the lens toward a scene; and
    a driving mechanism configured to translate the board via the first set of flexures, thereby translating each light source relative to the lens in a first plane substantially perpendicular to the optical axis of the lens, and scanning the respective light beam emitted by each light source over the scene.

11. The light projection system of claim 10 wherein the scene comprises a screen, the light projection system further comprising:
    a controller configured to modulate the respective light beam emitted by each light source synchronously with the translation of the board such that an image is formed on the screen, wherein the respective light beam emitted by each light source forms a respective subfield of the image, and each pixel of the respective subfield corresponds to a respective position of the board.

12. The light projection system of claim 10 wherein the first set of flexures comprises a plurality of bendable beams.

13. The light projection system of claim 10 wherein the driving mechanism is configured to translate the board in two orthogonal dimensions.

14. The light projection system of claim 13 wherein the driving mechanism is configured to translate the board in a Lissajous pattern.

15. The light projection system of claim 10 wherein the driving mechanism comprises one or more voice coils, or one or more piezoelectric transducers, or one or more linear motors.

16. The light projection system of claim 10 wherein the one or more light sources comprise one or more semiconductor lasers, or one or more fiber-coupled lasers, or one or more high-intensity light-emitting-diodes (LEDs).

17. The light projection system of claim 10 further comprising:
a second set of flexures flexibly attaching the lens to the base;
wherein the driving mechanism is configured to translate the lens via the second set of flexures so that the lens is translated in a second plane substantially perpendicular to the optical axis of the lens.

18. The light projection system of claim 17 wherein the driving mechanism is configured to:
translate the lens in a first dimension; and
translate the board in a second dimension substantially orthogonal to the first dimension.

19. The light projection system of claim 17 wherein the driving mechanism is configured to translate the lens and the board in opposite directions with respect to each other at any instant.

20. The light projection system of claim 10 wherein the scanning of the respective light beam emitted by each light source forms one or more sequential image frames over the scene, and the light projection system further comprising:
a controller configured to dynamically modulate the respective light beam emitted by each light source synchronously with the scanning of the respective light beam, so that the light beams emitted by the one or more light sources illuminate different portions of the scene at two different image frames of the one or more sequential image frames.

21. The light projection system of claim 10 is part of an automobile headlamp and further comprises a controller configured to dynamically change a range of the translation of the board so as to change the automobile headlamp from a high-beam state to a low-beam state, or vice versa.

22. A method of projecting an image onto a scene, the method comprising:
emitting, using a light source, a light beam;
translating a lens relative to the light source, via a set of flexures flexibly attaching the lens to a base, in a plane substantially perpendicular to an optical axis of the lens, wherein:
the light source is positioned substantially at a focal plane of the lens;
the lens is configured to project the light beam toward the scene so that the light beam illuminates a plurality of pixels sequentially as the lens is translated, each pixel corresponding to a respective position of the lens; and
translating the lens comprises translating the lens in two orthogonal dimensions; and
modulating the light beam synchronously with the translation of the lens such that each pixel of the plurality of pixels is illuminated according to a content of the image, thereby forming the image on the scene.

23. The method of claim 22 wherein the lens is translated at a frame rate that ranges from about 10 Hz to about 60 Hz.

24. The method of claim 22 wherein modulating the light beam comprises modulating an intensity of the light beam.

25. The method of claim 22 wherein the image is a color image, the light source comprises three light-emitting elements configured to emit red light, green light, and blue light, respectively, and modulating the light beam comprises modulating intensities of the red light, the green light, and the blue light.

26. The method of claim 22 wherein translating the lens comprises translating the lens in a Lissajous pattern.

27. The method of claim 22 wherein the translation of the lens forms one or more sequential image frames over the scene, and the method further comprises:
dynamically changing a range of the translation of the lens as the lens is translated from a first image frame to a second image frame subsequent to the first image frame, so that the first image frame and the second image frame illuminate different portions of the scene.

* * * * *